US012291002B2

(12) United States Patent
Wood

(10) Patent No.: US 12,291,002 B2
(45) Date of Patent: May 6, 2025

(54) HOT FORMING PRESS

(76) Inventor: Chris Wood, Tillsonburg, CA (US)

( * ) Notice: Subject to any disclaimer, the term of this patent is extended or adjusted under 35 U.S.C. 154(b) by 533 days.

(21) Appl. No.: 14/240,174

(22) PCT Filed: Aug. 22, 2012

(86) PCT No.: PCT/CA2012/000773
§ 371 (c)(1),
(2), (4) Date: Feb. 27, 2014

(87) PCT Pub. No.: WO2013/026137
PCT Pub. Date: Feb. 28, 2013

(65) Prior Publication Data

US 2014/0202345 A1 Jul. 24, 2014

Related U.S. Application Data

(60) Provisional application No. 61/526,045, filed on Aug. 22, 2011.

(51) Int. Cl.

| | |
|---|---|
| ***B30B 15/14*** | (2006.01) |
| ***B21D 22/20*** | (2006.01) |
| ***B30B 1/26*** | (2006.01) |
| ***B30B 9/28*** | (2006.01) |
| ***B30B 15/16*** | (2006.01) |
| ***B30B 15/26*** | (2006.01) |
| ***B30B 15/34*** | (2006.01) |

(52) U.S. Cl.
CPC ............ *B30B 15/14* (2013.01); *B21D 22/208* (2013.01); *B30B 1/266* (2013.01); *B30B 9/28* (2013.01); *B30B 15/142* (2013.01); *B30B 15/16* (2013.01); *B30B 15/26* (2013.01); *B30B 15/34* (2013.01)

(58) Field of Classification Search
CPC ........... B30B 15/14; B30B 1/266; B30B 9/28; B30B 15/16; B30B 15/34; B30B 15/22; B30B 15/26; B30B 15/142; B21D 22/208; B21D 24/16; B21D 37/16
USPC .......................................................... 100/315
See application file for complete search history.

(56) References Cited

U.S. PATENT DOCUMENTS 4,147,486 A * 4/1979 Jahnle ..................... B30B 15/22 425/451.2
4,828,474 A * 5/1989 Ballantyne ............ B30B 15/245 425/150
5,555,798 A * 9/1996 Miyashita ............... B30B 11/04 100/218
6,126,987 A 10/2000 Nakagawa et al.
6,128,987 A * 10/2000 Nakagawa .............. B30B 1/323 100/269.14

(Continued)

*Primary Examiner* — Adam J Eiseman
*Assistant Examiner* — Fred C Hammers
(74) *Attorney, Agent, or Firm* — Benesch Friedlander Coplan & Aronoff LLP

(57) ABSTRACT

The present invention relates to a press suitable for forming hot blanks into components. The press of this invention includes a mechanical press, which may be servo-driven, a hydraulically controlled bolster and a stationary bed. The mechanical press is adapted for vertical reciprocal movement towards the stationary bed for hot forming the blanks placed in dies on the stationary bed. The hydraulically controlled bolster is adapted for quenching the hot formed blank placed on the die. The present invention relates also to a method of hot forming or hot stamping blanks using the press of the present invention.

12 Claims, 4 Drawing Sheets

(56) References Cited

U.S. PATENT DOCUMENTS

| | | | | |
|---|---|---|---|---|
| 6,654,661 | B2 * | 11/2003 | Schmitz | B30B 15/142 700/206 |
| 6,772,682 | B1 | 8/2004 | Daniel et al. | |
| 7,165,437 | B2 * | 1/2007 | Shin | B21D 24/00 100/269.06 |
| 7,357,073 | B2 | 4/2008 | Aoshima et al. | |
| 2002/0096431 | A1 * | 7/2002 | Sevigny | G01N 27/44782 204/620 |
| 2010/0089255 | A1 * | 4/2010 | Shimao | B30B 15/041 100/269.06 |
| 2010/0192659 | A1 * | 8/2010 | Krajewski | B21D 22/208 72/349 |
| 2011/0068519 | A1 * | 3/2011 | Kwon | B21D 37/16 266/259 |
| 2011/0165283 | A1 * | 7/2011 | Nakai | B30B 15/34 425/405.2 |
| 2014/0056753 | A1 * | 2/2014 | Naitou | B21D 37/16 420/104 |

* cited by examiner

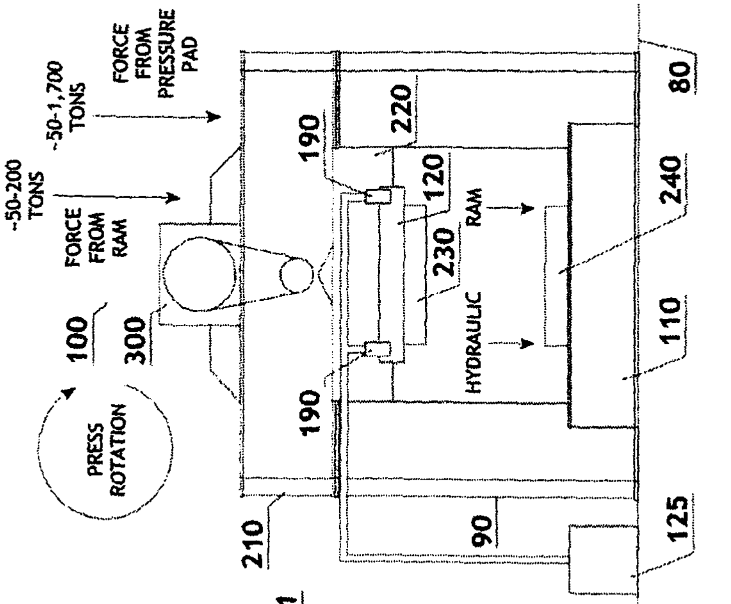
FIG. 1C
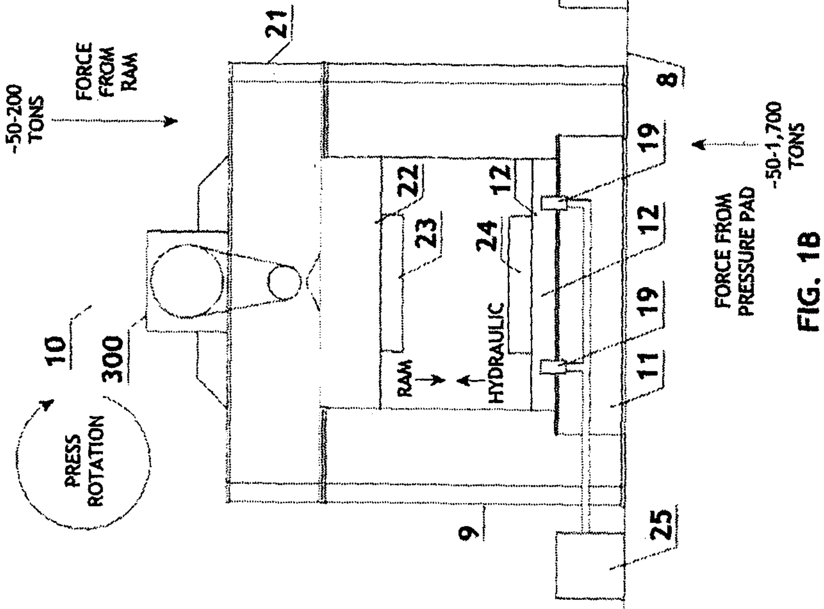
FIG. 1B
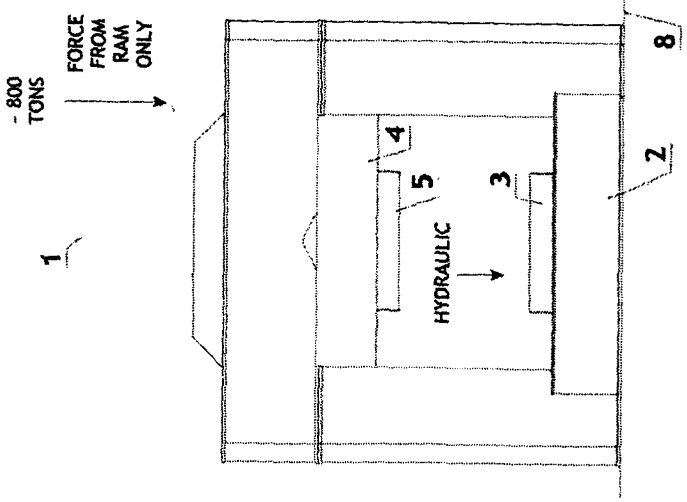
FIG. A
(Prior Art)

HOT FORMING PRESS

CROSS REFERENCE TO RELATED APPLICATIONS

This application a national stage application under 35 U.S.C. 371 of International Application No. PCT/CA2012/000773, filed Aug. 22, 2012, which in turn claims the benefit under 35 U.S.C. 119 (e) of U.S. Provisional Ser. No. 61/526,045, filed August 22, 2011, the contest of each of which are hereby incorporated by reference into the present disclosure.

FIELD OF INVENTION

The present invention relates to a forming press suitable for hot forming or hot stamping parts. Specifically, the present invention relates to a forming press which includes a mechanically-controlled ram and a hydraulically controlled bolster. In aspects of the present invention, the mechanically-controlled ram is controlled by a servo motor.

BACKGROUND OF THE INVENTION

Current methods for producing hot stamped/ hot formed parts such as automotive, agricultural, heavy equipment and aviation structure components utilize a hydraulic power press with conventional press operation.

Hot-stamping or hot-forming metallurgy starts with heating sheet iron, iron-based metal, or steel sheet blanks to a temperature at which it changes crystal structure of the metal from ferrite to austenite in a furnace at relatively high temperature (between 900 degrees Celsius and 980 degrees Celsius) for a sufficient amount of time (approximately five to 10 minutes). The substantially hot blanks (i.e. blanks having a substantially austenite structure) are then quickly transferred into a cooled stamping die, usually in a hydraulic press, using, for example, an automatic feeding system (i.e. robots). Automatic feeding transfer generally takes less than about three seconds. At relatively high temperatures of about 600° C. to about 980° C., the blanks have excellent formability and can be formed into a complex shape in a single stroke. Quenching takes place simultaneously or right after forming. During quenching, the austenitic microstructure transforms into a martensitic one because of rapid cooling (between 50° C./second and 100° C./second).

FIG. 1A illustrates a conventional hydraulic press 1 of the prior art. The hydraulic press 1 may include a top slide or ram 4 which may carry an upper die 5 and which can be moved downward for pressing a blank placed on a bottom die 3 supported by a stationary bed 2, fixed to the floor 8.

Hydraulic presses constitute a capital intense solution to hot-stamping parts, which not all medium-sized manufactures can fund. Hydraulic presses are speed restricted by design and not easily controlled. Other disadvantages of hydraulic presses include safety concerns in regards to the hydraulic supply lines being located in close proximity (usually over top of) to high heat components of the press such as the part and forming die. Typically, hydraulic presses are very tall requiring expensive buildings, are noisy and require a substantial amount of energy to operate. Typical hydraulic presses also include many moving parts, including motors and valves. In view of the foregoing, hydraulic presses are quite expensive to produce, buy, install, maintain, and operate.

Mechanical presses are commonly used to form industrial products such as auto parts, which are stamped or pressed from steel blanks. In mechanical presses, the parts are pressed between an upper and a bottom die. The upper die is connected to the press slide or ram, which moves up and down within the slide guides, while the bottom die is either fixed or mounted on a stationary bolster affixed to the press bed. The ram motion is driven by a press mechanism commonly located in the upper part of the press. Traditionally, the press ram and power transmission system is driven by a flywheel. The flywheel is connected and disconnected to the power transmission by means of a clutch and a brake system, which may be pneumatic or hydraulic. The crank may be driven in any manner, including by means of a suitable motor. The ram may also be raised and lowered with a servo motor as the power source, without requiring a flywheel. U.S. Pat. No. 7,357,073 discloses a press driven by a servo-motor. In servo-driven mechanical presses, a servo motor accelerates the press to a high speed, which is higher than the forming speed. Before impacting the blank to be formed, the motor slows the press down to forming speed. Once the pressing step is completed, the motor accelerates to open the press for unloading the formed part.

Servo-driven mechanical presses are very efficient and controllable for forming parts. However servo-driven mechanical presses are not capable of delivering enough holding force for a required time to quench a hot formed blank as the servo drive will overload.

What is needed is a forming press capable of efficiently and controllably forming parts, which is also capable of delivering sufficient holding force for a required time to obtain efficient quenching of a formed blank and which does not include the disadvantages associated with using a hydraulic press.

SUMMARY OF THE INVENTION

The present invention relates to a press suitable for hot forming or hot stamping. In one embodiment, the press includes a hydraulically-controlled bolster working in conjunction with a mechanically driven pressing plate. In aspects of the invention, the mechanically driven pressing plate is driven by a servo motor. The present invention relates also to methods of using the press of the present invention and to automated systems for hot forming or hot stamping.

In one embodiment, the present invention relates to a forming press, the forming press comprising a mechanically driven ram, a hydraulically controlled bolster and a stationary bed.

In one embodiment the present invention provides for a forming press, the forming press comprising: (a) a stationary bed supporting a bottom die, (b) a mechanically driven ram carrying a top die, and (c) a hydraulically controlled bolster, wherein the mechanically driven ram carrying the top die is adapted for reciprocal vertical movement between a start point which exists in the vicinity of a top dead centre of the mechanically driven ram and a forming point which exists in the vicinity of a bottom dead centre of the mechanically driven ram, whereby a heated blank substantially placed on the bottom die is pressed and formed in between the bottom and top dies into a heated part when the ram reaches the forming point, wherein the hydraulically controlled bolster is adapted for hydraulically urging the bottom and top dies together for a time sufficient and using sufficient pressure whereby the heated part is quenched in between the bottom and top dies, and wherein said mechanically driven ram is further adapted for being substantially held at the forming point during the quenching of the heated part.

In one embodiment of the forming press of the present invention, the hydraulically controlled bolster is coupled to the mechanically driven ram. and the top die is coupled to the hydraulically controlled bolster.

In another embodiment of the forming press of the present invention, the hydraulically controlled bolster is adapted for hydraulically urging the top die against the bottom die for quenching the heated part while the mechanically driven ram is substantially held at the forming point.

In another embodiment of the forming press of the present invention, the hydraulically controlled bolster is coupled to the stationary bed, and the bottom die is connected to the hydraulically controlled bolster.

In another embodiment of the forming press of the present invention, the hydraulically controlled bolster is adapted for hydraulically urging the bottom die against the top die for quenching the heated part while the mechanically driven ram is substantially held at the forming point.

In another embodiment of the forming press of the present invention, the mechanically driven ram is further adapted for downward movement at a first speed between the start point and a transition point prior to the forming point, and for downward movement at a second speed from the transition point to the forming point. In one aspect of the present invention the first speed is faster than the second speed.

In another embodiment of the forming press of the present invention, the bottom die and the top die are adapted for extracting heat from the heated part during the quenching of the heated part.

In another embodiment of the forming press of the present invention, the bottom die and the top die include channels adapted for extracting heat from the heated part during the quenching of the formed blank.

In another embodiment of the forming press of the present invention, the forming press is capable of producing from about 100 to about 1,900 metric tons of pressure.

In another embodiment of the forming press of the present invention, the mechanically driven ram is capable of producing between about 50 and about 200 metric tons of pressure, and wherein said hydraulically controlled bolster is capable of producing between about 50 to about 1,700 metric tons of pressure.

In another embodiment of the forming press of the present invention, the hydraulically controlled bolster includes about 25 mm of stroke.

In another embodiment of the forming press of the present invention, the forming press further comprises a servo motor for controlling the reciprocal vertical motion of the mechanically driven ram.

In one embodiment the present invention provides for a method of hot forming a part, said method comprising: (a) placing a substantially heated blank on a bottom die connected to a stationary bed, (b) moving a mechanically driven ram carrying a top die from a start point which exists in the vicinity of a top dead centre of the mechanically driven ram to a forming point which exists in the vicinity of a bottom dead centre of the mechanically driven ram, thereby pressing and forming the substantially heated blank between the bottom die and the top die into a heated formed part; (c) substantially holding the mechanically driven ram at the forming point and using a hydraulically controlled bolster for hydraulically urging the bottom and top dies together for sufficient time and under the sufficient pressure to quench the heated part; (d) moving the mechanically driven ram towards the start point; and (e) releasing the formed part.

In one embodiment of the method of hot forming a part of the present invention, the bottom die is coupled to the hydraulically controlled bolster and wherein during step (c) the hydraulically controlled bolster urges the bottom die against the top die being held at the forming point by the mechanically driven ram.

In another embodiment of the method of hot forming a part of the present invention, the bottom die is coupled to a stationary bed, the hydraulically controlled bolster is coupled to the mechanically driven ram and the top die is coupled to the hydraulically controlled bolster, and wherein during step (c) the hydraulically controlled bolster urges the top die against the bottom die while the top dies is being held at the forming point by the mechanically driven ram.

In another embodiment of the method of hot forming a part of the present invention, the mechanically driven ram is adapted to travel at a first speed between the start point and a transition point prior to the forming point, and to travel at a second speed from the transition point to the forming point.

In another embodiment of the method of hot forming a part of the present invention, the motion of the mechanically driven ram is controlled by a servo motor.

In one embodiment, the present invention provides for an automated system for hot forming parts, the system comprising: (a) a press of the type suitable for forming blanks, the press comprising a mechanically driven ram, a hydraulically controlled bolster and a stationary bed; (b) robotic means for loading the one or more blanks on the bed; and (c) robotic means for unloading the one or more components from the bed.

In one embodiment of the automated system for hot forming parts of the present invention, motion of the mechanically driven ram is controlled by a servo motor.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein:

FIG. 1A illustrates a front view of a conventional hydraulic press of the prior art.

FIG. 1B illustrates a front view of a combination press in accordance with one embodiment of the present invention.

FIG. 1C illustrates a front view of a combination press in accordance with another embodiment of the present invention.

Figure 2:
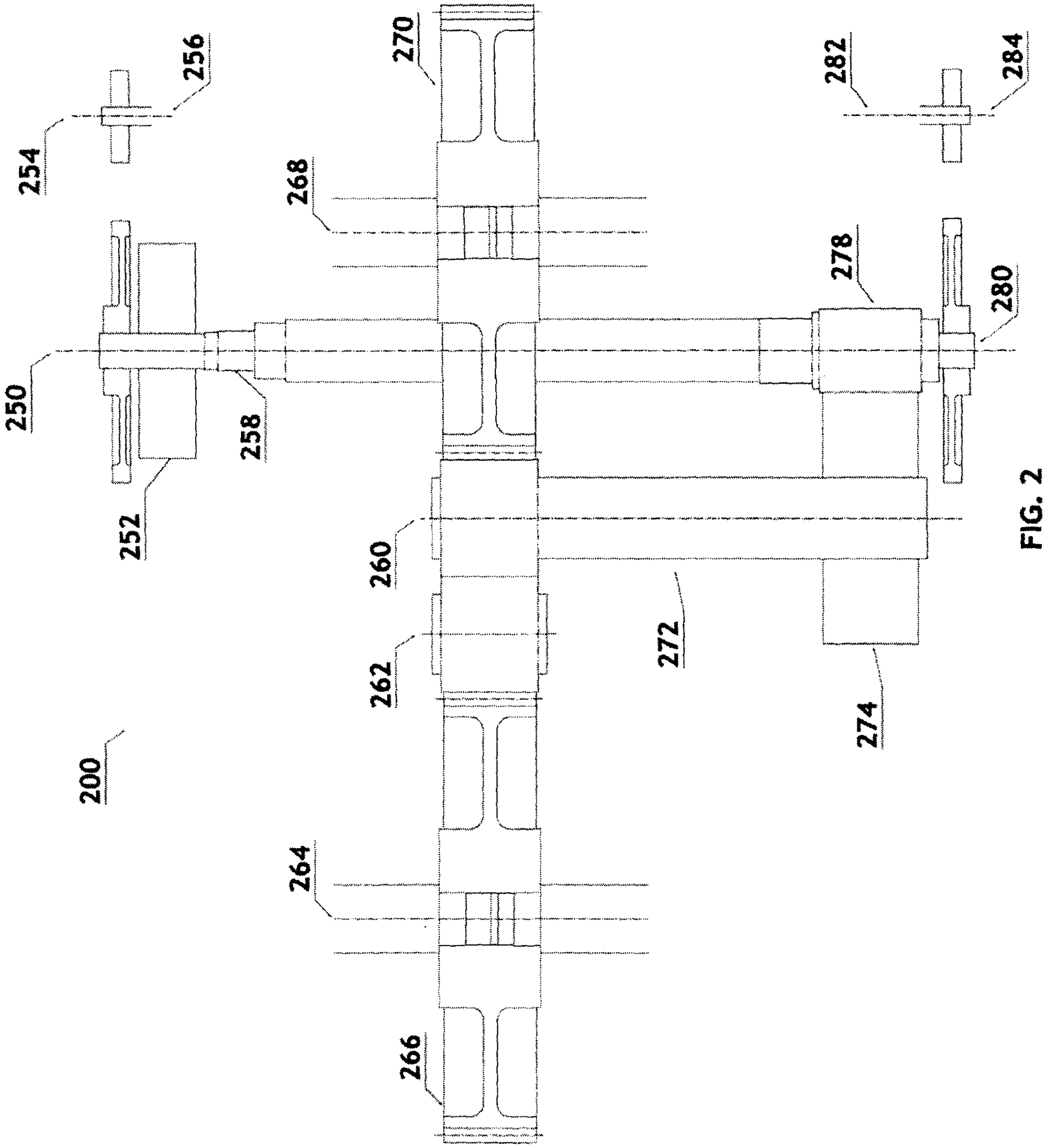
FIG. 2 illustrates a press gear-train section in accordance with one embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

Overview

Unless defined otherwise, all technical and scientific terms used herein have the same meaning as commonly understood by one of ordinary skill in the art to which this invention belongs. Also, unless indicated otherwise, except within the claims, the use of "or" includes "and" and vice-versa. Non-limiting terms are not to be construed as limiting unless expressly stated or the context clearly indicates otherwise (for example "including", "having" and "comprising" typically indicate "including without limitation"). Singular forms included in the claims such as "a", "an" and "the" include the plural reference unless expressly stated otherwise.

The present invention is a press for hot forming or hot stamping parts, which may include a hydraulically controlled bolster and a mechanically driven ram. In aspects, the forming press of the present invention may also include a bed. In one embodiment, the bed may be supporting the hydraulic bolster. In another embodiment, the hydraulic bolster may be coupled to the ram. In aspects of the invention the ram may be driven by a servo motor.

The Combination Press of the Present Invention

With reference to FIG. 1B, a forming or combination press 10 according to one embodiment of the present invention may include a hydraulically controlled bolster or pressure pad 12 and a mechanical press 21 having a ram 22, which may be driven in any manner known in the art, including by means of a suitable servo motor (not shown). In the embodiment of FIG. 1B, the hydraulically controlled bolster 12 is coupled to a stationary base or bed 11.

With continued reference to FIG. 1B, the combination press 10 may include a rigid framework 9 which may support and guide the pressing apparatus of the present invention. It should be understood that other types of components of the present forming press may be used without departing from the scope of the present invention.

With continued reference to FIG. 1B, the stationary base or bed 11 of the forming press 10 may be fixed to a surface 8, such as the ground floor of a manufacturing facility. In the embodiment illustrated in FIG. 1B, bed 11 is adapted to support the hydraulically controlled bolster 12. The hydraulically controlled bolster may, for example be supported by one or more hydraulic cylinders or platens 19 connected to the stationary bed 11. Platens 19 may be connected to a hydraulic power pack or reservoir 25. The hydraulically controlled bolster 12 may in turn may be adapted to receive (mounted or fixed) a bottom forming die 24 which may be adapted for substantially receiving a substantially heated blank to be formed into a part. The one or more hydraulically movable platens 19 may be configured for hydraulically controlling the pressure power which may be applied to the hydraulically controlled bolster 12 for urging the hydraulically controlled bolster 12 relative to the ram plate 22 as exemplified below.

With continued reference to FIG. 1B, the mechanical press 21 of the forming press 10 may be the top or upper part of a standard mechanical press of the prior art. The mechanical press part 21 may include a slidable ram plate 22, which in aspects of the invention may be adapted to receive an upper or top forming die 23. The top ram plate 22 may be mounted for guided vertical reciprocating movement along slide guides in the framework 9 of the combination press 10. The vertical reciprocating motion of the ram 22 may be driven by gear train assembly 300, which may be located in an upper part of the press 10. The gear train assembly may include a crank (not shown in FIG. 1B) which in turn may include connecting rods (not shown) for attaching to the ram. The crank may be driven in any manner including by means of a suitable electric motor, which may include a servo motor. The crank may also carry a flywheel (not shown) and may have coupled a control unit (not shown). A brake, which may be a pneumatic brake (not shown), may also be included for controlling the speed of the ram or for substantially holding the ram during final hydraulic form pressure of the one or more components being produced.

The mechanically driven ram 22 carrying the top die 23 may be adapted for reciprocal movement between a start point which exists in the vicinity of a top dead centre of the ram and a forming point which exists in the vicinity of a bottom dead centre of the ram 22. A heated blank may be formed into a heated part substantially under ram 220 movement when the ram 22 reaches the forming point. The mechanically driven 22 ram may be further adapted for being substantially held at the forming point during the final forming and quenching of the heated part as explained herein bellow.

The hydraulically controlled bolster 12 may be adapted for hydraulically urging or pressing the bottom die 24 against the top die 23 being substantially held at the forming point by the ram 22 for a time sufficient and using sufficient pressure whereby the heated part is quenched in between the bottom 24 and top 23 dies.

With reference to FIG. 1C, a combination press 100 according to another embodiment of the present invention may include a stationary base 110, a top mechanical press 210, which in aspects of the present invention may include a servo motor (not shown), and a hydraulically controlled bolster 120. In the embodiment illustrated in FIG. 1C, the hydraulically controlled bolster 120 is coupled to the top mechanical press 210.

With continued reference to FIG. 1C, the press 100 may include a rigid framework 90 which may support the pressing apparatus to be described. It should be understood that other types of components of the present forming press may be used without departing from the scope of the present invention.

With continued reference to FIG. 1C, the top mechanical press 210 of the forming press 100 may be the top or upper part of a standard mechanical press of the prior art.

The top mechanical press part 210 may include a slidable top ram plate 220. The top ram plate 220 may be mounted for guided vertical reciprocating movement along slide guides in the framework 90 of the combination press 100. The vertical reciprocating motion of the ram 220 may be driven by any means known in the art such as by a crank (not shown), which may be located within a gear train assembly 300 located in an upper part of the press 100. The crank may be driven in any manner, including by means of a suitable electric motor, which may include a servo motor. The crank may also carry a flywheel (not shown) and may have coupled a control unit (not shown). A brake, which may be pneumatic or a hydraulic brake (not shown), may be included for controlling the velocity of the ram plate or for substantially holding the ram during final hydraulic form pressure of the one or more components being produced With continued reference to FIG. 1C, the stationary base or bed 110 of the press 100 may be fixed to a surface 80, such as the ground floor of a manufacturing facility. The bed 110 may be adapted to receive (mounted or fixed) a bottom forming die 240 which may be adapted for substantially receiving a substantially heated blank to be formed into a part or component.

In the embodiment illustrated in FIG. 1C, ram 220 may be adapted to support a hydraulically controlled bolster or pressure pad 120. The hydraulically controlled bolster 120 may, for example be supported by one or more hydraulic cylinders or platens 190 connected to the top mechanical press 210. The one or more hydraulically platens 190 may be configured for hydraulically controlling the pressure power which may be applied to the hydraulically controlled bolster 120 for urging the hydraulically controlled bolster 120 relative to the bed 110 as exemplified below. The hydraulically controlled bolster may be adapted to receive an upper or top forming die 230. The one or more hydraulic cylinders or platens 190 may be connected to a hydraulic power pack or reservoir 125.

The mechanically driven ram 220 carrying the hydraulically controlled bolster 120 and the top die 230 may be adapted for reciprocal movement between a start point which exists in the vicinity of a top dead centre of the ram and a forming point which exists in the vicinity of a bottom dead centre of the ram 220, whereby a heated blank substantially placed on the bottom die 240 is pressed and formed in between the bottom 240 and top 230 dies into a heated part when the ram 220 reaches the forming point.

The heated blank may be formed into a heated blank substantially under ram 220 movement. The mechanically driven ram 220 may be further adapted for being substantially held at the forming point during the final forming and quenching of the heated part.

The hydraulically controlled bolster 120 may be adapted for hydraulically urging the top die 230 against the bottom die 240 being supported by the stationary bed 120 for a time sufficient and using sufficient pressure whereby the heated part is quenched in between the bottom 240 and top 230 dies.

FIG. 2 illustrates a gear-train section 200 which may be used with the embodiments of FIG. 1B or FIG. 1C. In one aspect of the present invention, a servo motor 256 may be adapted to drive shaft 258 of the gear train assembly 200 directly. In this instance the servo motor 256 may drive the main drive shaft 258, which would turn the crank shaft 264 which is connected to the ram of the forming press via connecting rods (not shown). In FIG. 2 250 represents first drive pulley, 252 is clutch/brake (such as a Wichita clutch/brake), 254 is first motor pulley, 256 is first motor, 258 is a first drive shaft, 260 is first idler pulley, 262 is second idler pulley, 264 is first crank, 266 is first crank pulley, 268 is second crank, 270 is second crank pulley, 272 is second drive shaft, 274 is idler connection pulley, 278 is transfer pulley, 280 is second drive pulley, 282 is second motor (optional) and 284 is second motor pulley (optional). In another aspect, the ram may be driven by a drive wheel and a crank. The drive wheel may, in turn, be driven through a gear mechanism by a drive motor, which may be a servo motor. A brake system and a gear box may also be included.

In one embodiment, the mechanical part of the press of the present invention may be adapted to generate between about 50 and about 200 metric tons of pressing forming force. The hydraulic bolster of the press of the present invention may include about 25 mm of stroke and it may be adapted to generate a pressure of about 1.3 times the press rated capacity (from about 50 to 1700 metric tons). Thus, the forming press of the present invention may be capable of producing a total tonnage of about 100 to 1,900 metric tons for forming and final quenching.

The hydraulically controlled bolster and the slidable mechanically driven ram plate may be programmable and automatically controlled by linking the bottom hydraulic base and the top mechanical press to a computer unit.

The combination press of the present invention may be capable of achieving about 4 press strokes per minute (SPM). More than 4 or less than 4 SPM may be possible.

Operation of the Combination Press of the Present Invention

The combination press of the present invention may be used in methods of hot forming or hot stamping a blank into a formed part. The blank may include a sheet of iron-based material or steel sheet blanks. The blanks may be provided at temperatures between about 600 degrees Celsius and about 980 degrees Celsius. In one embodiment, a method of hot forming may include: (a) moving a mechanically driven ram plate from a start point to a forming point whereby a substantially heated blank substantially placed between the top ram plate and a bed is formed into a heated part; (b) quenching the heated part by substantially holding the ram plate at the forming point and hydraulically urging the heated part against the substantially held ram plate using a hydraulically controlled bolster; and (c) releasing the formed part.

In operation, the ram of the mechanical press may move vertically from the top of the press, in the vicinity of a top dead centre of the ram, to close a die connected to the ram relatively quickly so that a heated blank placed on a bottom die, which may be supported by the stationary bed (reference number 110 of FIG. 1C) or the hydraulic bolster (reference number 12 of FIG. 1B), stays at the forming temperature. The hydraulic bolster or cushion may be programmed for light pressure so that the heated blank may be formed substantially under ram movement. Once the ram is at the bottom of its stroke, in the vicinity of the ram's bottom dead center, the ram may be held in place, and the hydraulically driven cushion may then be energised with pressure, such as for maximum pressure, to create a holding force to press the upper and bottom dies together such as to make equal contact with the blank in between the dies. The dies may be adapted to extract the heat out of the formed heated blank to quench it into martensite. The hydraulic bolster is required to create the holding force to press the die together and make equal contact on the part. After quenching, the hydraulic pressure may be released, the ram plate may return to the top of the press so that the completed part may be removed and a new heated blank may be loaded for a next cycle.

The die surfaces (upper and bottom forms) may need to be very accurate in part contact area. The part becomes intimate with the die form sections during the forming operation, it is held under high tonnage, and the quenching occurs as the die material, which is relatively cooler relative to the heated blank, extracts the heat from the part. The die form sections may also include cooling channels that aid the heat extraction (quenching) process. Cooling channels may carry cooling agents such as water or oil-based cooling agents known in the art.

In one embodiment, the present invention relates to a method for hot-stamping or hot-forming blanks into components using the press of FIG. 1B. The method may include moving the top ram plate carrying a top die from a top point in the vicinity of a top dead centre of the ram towards the hydraulically controlled bolster to a pressing point such as a blank placed on a bottom die supported by the hydraulically controlled bolster may be pressed and formed into a heated part in between the ram and the hydraulically controlled bolster. The ram of the top mechanical press may be substantially held in position at the pressing point while the hydraulically controlled bolster may be urged against the substantially held ram plate so that the heated part may be further formed and quenched in between the bottom and top dies. The ram may be moved from the pressing point to the start point and the formed and quenched part may then be released from the press as a formed component.

In one embodiment, the present invention relates to a method for hot-stamping or hot-forming blanks into components using the press of FIG. 1C. The method may include moving the top ram plate carrying the hydraulically controlled bolster and a top die from the starting point in the vicinity of a top dead centre of the ram and towards the bed such as a blank placed on a bottom die supported by the bed may be pressed and formed into a heated part in between the top ram and the bed. The top ram may be substantially held in position at the pressing point while the hydraulically controlled bolster may be urged against the bed so that the heated part may be further formed and quenched between the top and bottom dies. The formed and quenched part may then be released from the combination press of the present invention as a formed component.

In one embodiment, the ram plate may be configured for moving from a starting position at the top of the combination press (a top dead center or TDC) to a pressing or forming position in the vicinity of a bottom dead center. The ram plate may travel at a relatively fast speed from the vicinity of the TDC to a transition point prior to the pressing position. At this transition point prior to pressing the blank, the ram plate may be slowed down to a pressing speed, Forming of the blank is done substantially under ram movement. The ram plate may travel at this pressing speed up to the final pressing position for carrying out the pressing of the blank.

When the top ram plate reaches its final pressing position, the ram plate may be held at this pressing position for example with the use of a holding brake. While the ram plate is being substantially held at the pressing position, the bolster may be activated with pressure power for urging a bottom die against the top die.

The hot-forming process of the present invention may be used for producing any part forming, which may require low forming pressure followed by high forming and quenching pressure at the bottom of the press stroke. Another example would be hot mould automotive carpets, which may require low forming pressure followed by a higher force at the bottom of the stroke to cut the outside shape of the carpet and hold the carpet to cool down or heat up, and form to the shape of the die. For this application the bed size would be similar but tonnage requirements may be lower although the principle remains the same.

The servo drive motor of the servo-driven mechanical part of the press of the present invention may allow programmable slide motion of the top ram plate. A programmable hydraulically controlled bolster on the hydraulic part may facilitate the final form pressure required for producing a final part shape and for rapid quenching which may be necessary for hot stamping process. In one embodiment of the present invention, the hot stamping process may be automatically driven by a computer unit.

Figure 3:
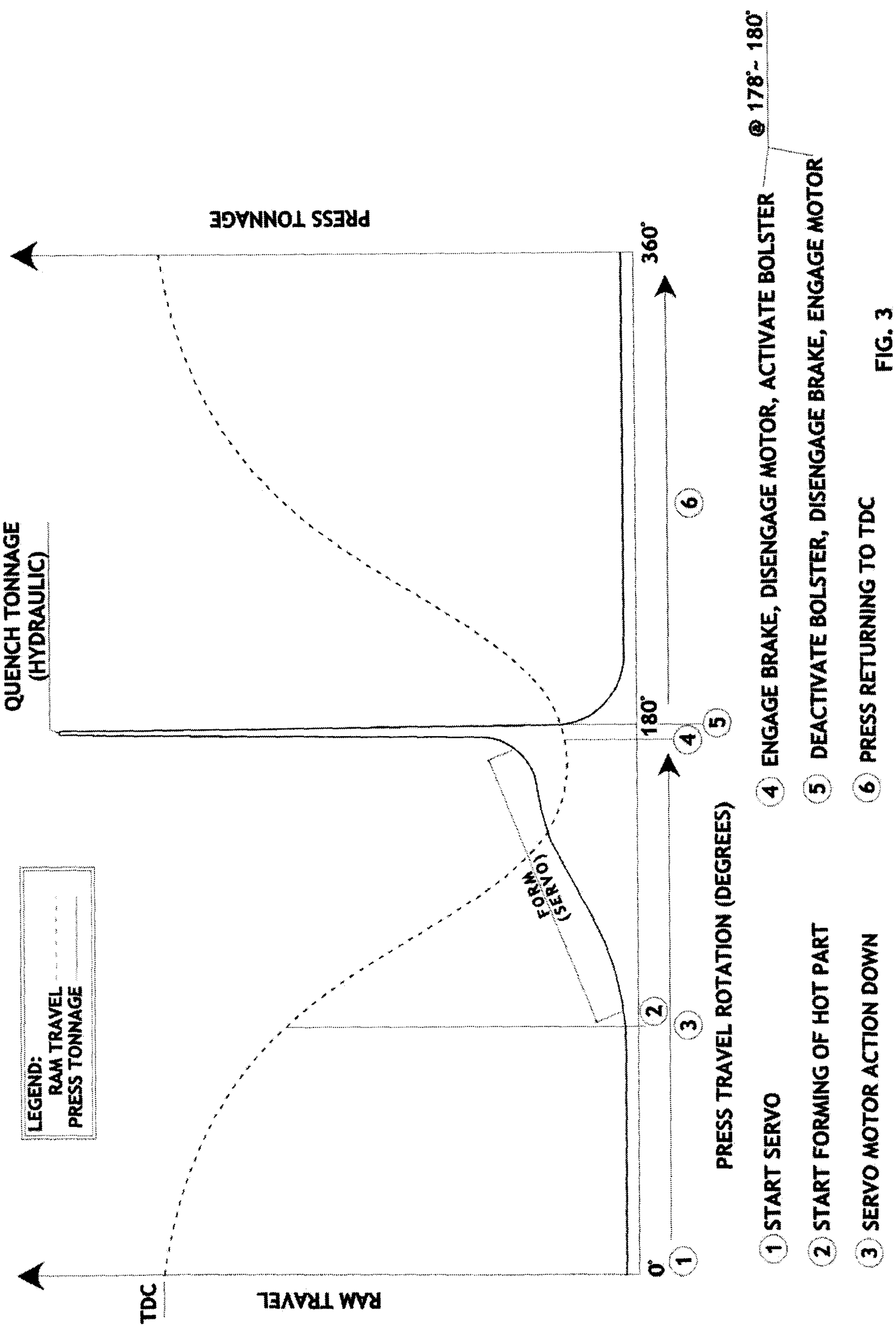
FIG. 3 is a graph illustrating a the ram plate travel and the bolster's tonnage relative to the ram plate travel during the process of hot stamping blanks with a press in accordance with one embodiment of the present invention.

FIG. 3 is a graph illustrating the slide motion of the ram and the quenching motion of the hydraulic bolster of the press illustrated in FIG. 1B of the present invention. In FIG. 3, the left hand Y axis illustrates ram travel speed, the right hand Y axis illustrates the press tonnage and the X axis illustrates different zones or steps during the operation of the press of the present invention. It should be understood that a similar method may be carried out with the press illustrated in FIG. 1C. At the start of the process the top servo part may be at TDC or in the vicinity of TDC and a hot blank may be loaded, for example by a robot, into a bottom die supported by the hydraulic bolster. The automatic process of manufacturing a hot stamped/hot formed part using the press of the present invention may start with a start or go command. Upon the start command, in step 1 the top mechanical ram plate, which may be servo-driven, may be moved downwardly with relatively high speed so that the heated blank loaded onto the bottom die half supported by the bottom bolster may remain substantially hot for the hot stamped process. Prior to contacting the blank (a point referred to as a transition point), the top ram plate, which may carry an upper die, may slow down its speed to a forming speed. During the forming step 2 of the blank, the bottom hydraulic bolster may be programmed for light pressure (up to about 300 metric tons) so that the blank may be formed in between the upper and bottom dies substantially due to the servo movement of the ram plate. In step 3 the servo motor action may be slowed down. In step 4 (the quenching step), once the top ram plate reaches the bottom of its stroke in the vicinity of its bottom dead centre, it may be substantially held in place (i.e in the vicinity of the bottom dead centre of the ram plate's stroke), for example by engaging a brake, the motor (if one is provided) may be disengaged, and the hydraulically controlled bolster is activated. For the quenching step 4 the programmable hydraulic bolster may be energized for maximum hydraulic pressure (from about 300 to about 1,500 metric tons) to create the holding force to press the upper and bottom dies together and make equal contact on the part in between the dies. The dies may be adapted to quench the formed blank into a substantially hard form (martensite). For example, the dies may include slots or channels so that cooling media such as oil or water can flow through each slot and cool the part. The quenching step 4 may also serve to further form the heated part. After sufficient time for cooling of the formed part, in step 5 the hydraulic pressure on the bottom bolster may be deactivated, the holding brake may be released and the servo-motor may be engaged. In step 6 the ram plate may be moved back towards the top of the stroke so that the completed formed blank may be removed, for example by a robot, and a new heated blank loaded (for example by a robot) for a next hot stamping cycle.

Figure 4:
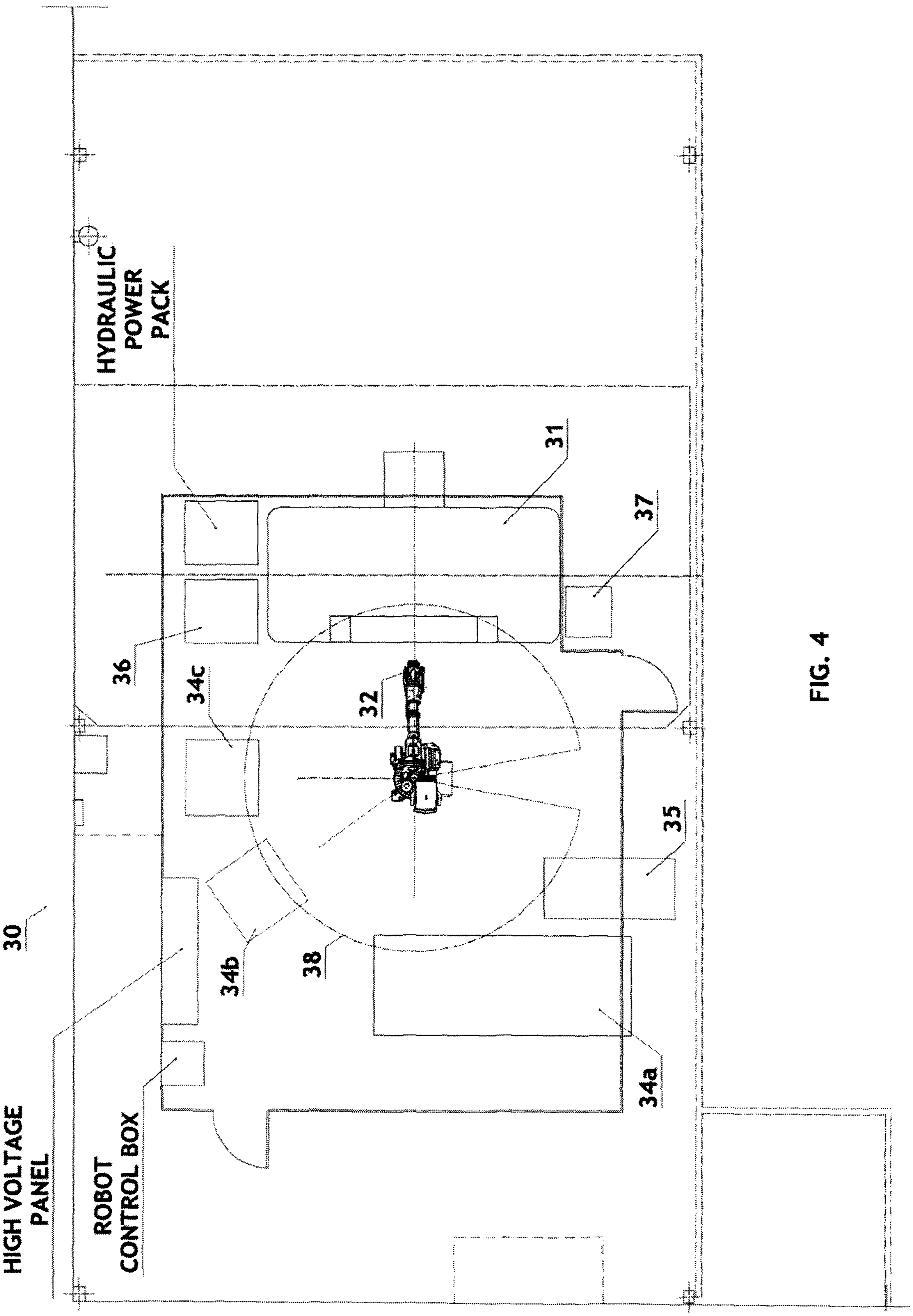
FIG. 4 illustrates a top view of a layout of a system for hot forming components using a press in accordance with one embodiment of the present invention.

The press of the present invention may be used in an automated system for hot pressing process. FIG. 4 illustrates a top view of a system in accordance with one embodiment of the present invention. The system 30 may include a press 31 of the present invention; a robot 32 for loading one or more blanks on the bottom hydraulically controlled bolster of the press (not shown in FIG. 4). In aspects of the invention, robot 32 may load the one or more blanks on a forming die supported by the bottom hydraulically controlled bolster of the press. Robot 32 may also be used for unloading the finalized one or more components from the press. The system 30 may also include one or more ovens for heating the blanks to be pressed and formed. In FIG. 4 three (3) ovens 34*a*, 34*b* and 34*c* are displayed, however, less than three (3) or more than three (3) ovens may be used. The different ovens may be set up and increasing temperatures so that the heating of the blanks may be progressive to reduce warp-age and waste of stale blanks. Robot 32 may be used for loading and unloading the blanks from one oven to the next and to the press 31. The circle 38 illustrates a maximum reach of robot 32, however it should be understood that this is just an example and in other embodiments robot 32 may have more or less maximum reach that the one indicated in FIG. 4. As shown in FIG. 4, in one aspect of the present invention, the system may further include a robot unload conveyor 35, a water tank 36 and an operator's station 37.

The main advantages of the press of the present invention over the prior art full hydraulic forming presses include: (a) better control of ram plate speed throughout the forming process; (b) faster return speed of ram plate than hydraulic; (c) better control of the hydraulic bolster; (d) by having a top mechanical press, no flammable hydraulic fluid processes over the hot blank (i.e. fewer hazards); (e) more energy efficient blank forming process; (f) less expensive as the press of the present invention may be manufactured utilizing and upgrading a used mechanical press; (g) quieter process than hydraulics; and (h) less moving parts therefore more reliable and cheaper to maintain.

The press of the present invention may be effective and efficient for hot stamping components, including doors/roof beams, pillars, reinforcements, structural, sun roof and suspension parts.

The above disclosure generally describes the present invention. Changes in form and substitution of equivalents are contemplated as circumstances may suggest or render expedient. Although specific terms have been employed herein, such terms are intended in a descriptive sense and not for purposes of limitation. Other variations and modifications of the invention are possible. As such modifications or variations are believed to be within the sphere and scope of the invention as defined by the claims appended hereto.

The invention claimed is:

1. A forming press, the forming press comprising:

a stationary bed fixed to a floor, a slidable ram carrying a top die, the slidable ram mounted on slide guides for guided reciprocal vertical movement between a start point which exists in a top dead centre of the slidable ram and a forming point which exists in a bottom dead centre of the slidable ram, a programmable servo motor for controlling said guided reciprocal vertical movement, said programmable servo motor controlling vertical speed and motion of the slidable ram between the start point and the forming point, a hydraulically controlled bolster coupled to the stationary bed, the hydraulically controlled bolster supporting a bottom forming die adapted for at least partially receiving a heated blank, the hydraulically controlled bolster being driven by two or more programmable hydraulic cylinders, each of the two or more hydraulic cylinders configured for controlling pressure power applied to the hydraulically controlled bolster from the stationary bed for hydraulically urging the bottom forming die and the top die together and applying a holding force, that is a pressure whereby the heated blank is formed and uniformly quenched in between the bottom forming die and the top die to form a hot forming part, and upon such quenching being complete hydraulic pressure is released thereby lowering the hydraulically controlled bolster prior to the hot forming part being removed from the forming press, and a brake configured for holding the slidable ram at the forming point, wherein the servo motor is operable to drive the slidable ram for downward movement at a first speed between the start point and a transition point prior to the forming point, and for downward movement at a second speed from the transition point to an end of the forming point, being the Bottom Dead Center of the slidable ram, wherein the first speed is faster than the second speed, and when the slidable ram reaches a bottom of its stroke, whereby the ram is in the vicinity of the Bottom Dead Centre, the brake is operable to hold the slidable ram at said bottom of its stroke, the servo motor is operable to be disengaged and the brake engaged, and wherein the programmable hydraulic cylinders are programmed for a first pressure when the slidable ram moves at the second speed and for a second pressure when the brake is engaged and the servo motor disengaged, wherein the first pressure is lower than the second pressure;

wherein the bottom forming die and the top die extract heat from the heated blank during quenching of the heated blank through one of the following: heat transfer to material of which one or more of the dies is formed from the heated blank, said material of which the one or more dies is formed being a cooler temperature relative to the temperature of the heated blank; or one or more cooling channels formed in one or more of the dies that aid in the extraction of heat from the heated blank, such one or more cooling channels being operable to carry cooling agents; and wherein the hydraulically controlled bolster is operable to exert pressure as a holding force for forming and quenching a heated blank, such holding force continuing until quenching of the heated blank is completed, the hydraulic pressure is released which lowers the hydraulically controlled bolster, the brake is disengaged, and the slidable ram is returned to its starting point.

2. The forming press of claim 1, wherein the hydraulically controlled bolster is adapted for hydraulically urging the bottom forming die against the top die for quenching the heated blank while the slidable ram is held at the forming point with the brake.

3. The forming press of claim 1, wherein said forming press is capable of producing pressure between 100 to 1,900 metric tons of pressure to form and uniformly quench the heated blank between the slidable ram and the hydraulically controlled bolster and to thereby quench the heated blank into martensite.

4. The forming press of claim 1, wherein said slidable ram is capable of producing pressure between 50 and 200 metric tons of pressure, and wherein said hydraulically controlled bolster is capable of producing pressure between 50 to 1,700 metric tons of pressure.

5. The forming press of claim 1, wherein said hydraulically controlled bolster includes 25 mm of stroke.

6. The forming press of claim 1, wherein said slidable ram is directly driven by the servo motor.

7. An automated hot forming system for hot forming parts, said system comprising:

a press of the type suitable for forming a hot forming part from a heated blank, said press comprising a ram, the ram mounted on slide guides for guided reciprocal vertical movement between a start point which exists in a top dead centre of the ram and a forming point which exists in a bottom dead centre of the ram, said ram adapted for being held at the forming point with a brake, a servo motor for driving the ram, a hydraulically controlled bolster coupled to a stationary bed fixed to a floor, the hydraulically controlled bolster being driven by two or more programmable hydraulic cylinders, each of the two or more hydraulic cylinders configured for controlling pressure power applied to the hydraulically controlled bolster from the stationary bed, the hydraulically controlled bolster supporting a forming die, wherein the servo motor is operable to drive the ram for downward movement at a first speed between the start point and a transition point prior to the forming point, and for downward movement at a second speed from the transition point to an end of the forming point being the Bottom Dead Center of the ram, wherein the first speed is faster than the second speed, and when the ram reaches a bottom of its stroke whereby the slidable ram is in the vicinity of the Bottom Dead Centre, the brake is operable to hold the ram at said bottom of its stroke, the servo motor is operable to be disengaged and the brake engaged, and wherein the programmable hydraulic cylinders are programmed for a first pressure when the ram moves at the second speed and for a second pressure when the brake is engaged and the servo motor disengaged, wherein the first pressure is lower than the second pressure, and said press being operable to apply a holding force, that is a pressure whereby the heated blank is formed and uniformly quenched by the forming die to form the hot forming part;

robotic means for loading the heated blank on the forming die and for unloading from the forming die the hot forming part, said hot forming part being formed from the heated blank from which is quenched and from which heat is extracted, being removed after hydraulic pressure is released from the programmable hydraulic cylinders whereby the hydraulically controlled bolster is lowered;

wherein the forming die extracts heat from the heated blank during quenching of the heated blank to form the hot forming part during quenching of the heated blank through one of the following: heat transfer to material of which the forming die is formed from the heated blank, said material of which the forming die is formed being a cooler temperature relative to the temperature of the heated blank; or one or more cooling channels formed in the forming die that aid in the extraction of heat from the heated blank, such one or more cooling channels being operable to carry cooling agents; and wherein the hydraulically controlled bolster is operable to exert pressure as a holding force for forming and quenching a heated blank, such holding force continuing from engagement of the brake until quenching of the heated blank is completed, the hydraulic pressure is released which lowers the hydraulically controlled bolster, the brake is disengaged, and the slidable ram is returned to its starting point.

8. The automated hot forming system of claim 7, wherein motion of the ram is controlled directly by the servo motor.

9. The automated hot forming system of claim 7, wherein the system further comprises one or more ovens for heating the heated blank, and wherein the robotic means is configured to reach the one or more ovens and the forming die.

10. The automated hot forming system of claim 9, wherein the system comprises two or more ovens.

11. The automated hot forming system of claim 7, wherein the system further comprises a computer linked to a programmable hydraulically controlled bolster, the computer having instructions to (i) keep the hydraulically controlled bolster to up to 300 metric tons of pressure when the ram is at the forming point so that the hot forming part is formed due to the movement of the ram, and (ii) energizing the hydraulically controlled bolster to a range of 300metric tons to 1,500 metric tons of pressure to apply pressure to the forming die and make equal contact on the heated blank in the forming die.

12. The forming press of claim 1, wherein a programmable hydraulically controlled bolster is linked to a computer having instructions to (i) keep the hydraulically controlled bolster at a light pressure of to up to 300 metric tons of pressure when the slidable ram is at the forming point so that the hot forming part is formed due to the movement of the slidable ram, and (ii) energizing the hydraulically controlled bolster to a range of 300 metric tons to 1,500 metric tons of pressure to press the upper and bottom dies together and make equal contact on the heated blank in between the upper and bottom dies and such pressure being devoid of any decrease until quenching of the heated blank is complete.

* * * * *